United States Patent [19]
Feldmann et al.

[11] Patent Number: 5,079,947
[45] Date of Patent: Jan. 14, 1992

[54] METHOD FOR APPROXIMATE INDICATION OF MEAN TEMPERATURE OF A COMPONENT OF A BRAKE DEVICE

[75] Inventors: Joachim Feldmann, Neustadt; Erwin Petersen, Wunstorf; Manfred Schult, Garbsen, all of Fed. Rep. of Germany

[73] Assignee: WABCO Westinghouse Fahrzeugbremsen GmbH, Hanover, Fed. Rep. of Germany

[21] Appl. No.: 581,525

[22] Filed: Sep. 12, 1990

[30] Foreign Application Priority Data

Sep. 13, 1989 [DE] Fed. Rep. of Germany ....... 3930572

[51] Int. Cl.$^5$ .......................................... G01M 19/00
[52] U.S. Cl. ...................................... 73/129; 340/453
[58] Field of Search ................... 73/129; 364/426.01; 340/453; 188/1.11

[56] References Cited

U.S. PATENT DOCUMENTS 4,649,370 3/1987 Thomason ........................... 340/453

FOREIGN PATENT DOCUMENTS

| 2144466 | 3/1972 | Fed. Rep. of Germany. |
| 2637775 | 3/1977 | Fed. Rep. of Germany. |
| 2608249 | 12/1978 | Fed. Rep. of Germany. |
| 3502052 | 7/1986 | Fed. Rep. of Germany. |
| 3502053 | 7/1986 | Fed. Rep. of Germany. |

Primary Examiner—Jerry W. Myracle
Attorney, Agent, or Firm—Horst M. Kasper

[57] ABSTRACT

A method for the approximate determination of the average temperature of a device component of a brake device. The average temperature is determined by the deformation of the device component at the start of a brake actuation and at a point in time $t_1$ following said start as well as by a temperature-dependent change of the elasticity module of the material of the device component. The method is particularly useful for surveillance of brake devices of vehicles with respect to overloading and fading.

27 Claims, 1 Drawing Sheet

METHOD FOR APPROXIMATE INDICATION OF MEAN TEMPERATURE OF A COMPONENT OF A BRAKE DEVICE

BACKGROUND OF THE INVENTION

1. Field of the Invention

The invention relates to a method for the approximate determination of the average temperature of a component of a brake device operated by a brake pressure, and an arrangement for performing the method.

2. Brief Description of the Background of the Invention Including Prior Art

Such a method is known from the German printed Patent Publication DE-OS 3,502,052 A1 to Erich Reinecke, cf. in particular first paragraph, page 10. This method projects the employment of several temperature sensors disposed on the device component or distributed in the neighborhood of the device component, where the temperature signals of several temperature sensors are averaged to one single signal which represents the average temperature of the device component.

Since a temperature sensor is a relatively expensive device element, the use of a plurality of temperature sensors represents substantial expenditures in connection with the conventional method.

The German Patent Laid Out DE-AS 2,608,249 to Peter R. Roth et al. teaches a method and a device for the measurement of transfer functions. The reference is concerned with a system where a random signal train of a finite length is periodically fed to a system and where the frequency spectrum of the fed-in signal series is measured during such a period in which the initial oscillation processes have declined to such an extent that the desired measurement accuracy is achieved. However, this reference does not address the particular needs associated with an effective surveillance of the temperatures present in a brake device of a vehicle.

The German printed Patent Publication DE-OS 2,637,775 to Peter Roth appears to be a continuation of the investigations underlying the above-recited Patent Application Laid Out DE-AS 2,608,249. In particular, this reference is concerned with the effects of transfer functions on stationary systems.

The German printed Patent Publication DE-OS 3,502,053 A1 to Erich Reinecke teaches a device for indicating the wear of a component. While this reference presents an example of how the wear of a component is to be determined, nevertheless, this reference does not direct to a temperature surveillance in critical parts of a brake device of a vehicle.

The German printed Patent Publication DE-OS 2,144,466 to H. Negendank et al. teaches a display apparatus for indicating the state of a brake friction lining of a vehicle. A temperature-sensitive element 40 forms part of an electric circuit 52, 28. This electric circuit can be connected to a display apparatus 50, 56 located remotely from the brake. The element 40 induces the display apparatus for providing a signal in cases where the temperature of the brake lining 14 reaches a predetermined value. While this reference employs a temperature-sensitive element, it appears, however, that reliable overall determination of a possibly existing temperature overloading of a device, having substantial spatial extension, is not ensured with the reference device

SUMMARY OF THE INVENTION

1. Purposes of the Invention

It is an object of the present invention to provide a method which simplifies the assessment of the temperatures to which a brake element is subjected.

It is a further object of the present invention to provide an improved method which avoids the use of an excessive number of sensors for determining the temperature state of an extended device element such as a brake lining.

These and other objects and advantages of the present invention will become evident from the description which follows.

2. Brief Description of the Invention

The present invention provides for a method for an approximate determination of an average temperature of a device component of a brake device including a wear readjustment device and actuatable by pressure. A temperature-dependent characterizing curve of a deformation value h for the device component, defining a characteristic deformation of the device component relative to temperature, and hereinafter referred to as deformation characterizing curve $h = f_{(T)}$, is established for a pressure-free brake device. A temperature-dependent characterizing curve of the elasticity module $E = f_{(T)}$ of the material forming the device component is determined. An initial value $h_0$ is measured characterizing an existing initial deformation of the device component at the start of a brake actuation at a point in time $t_0$. An initial temperature $T_0$ of the device component is observed relative to the value $h_0$, characterizing the initial deformation from the temperature-dependent deformation characterizing curve $h = f_{(T)}$. An initial elasticity module $E_0$, coordinated to the initial temperature $T_0$, is determined from said temperature-dependent characterizing curve of the elasticity module $E = f_{(T)}$. At a predetermined point in time $t_1$ after initiation of a brake actuation, a brake pressure $p_1$ and a value $h_1$ is measured, characterizing an existing deformation. The component $h_{1el}$ of the value $h_1$, representing the elastic deformation of the device component, is approximated based on the relationship $$h_{1el} = \frac{1}{E_0} \cdot C \cdot (p_1 - p_0)$$

with $p_0$ being a response pressure of the brake device. The component $h_{1th}$, representing the thermal deformation, is approximated by employing the relationship $$h_{1th} = h_1 - h_{1el} - h_0.$$

An approximated average temperature $T_1$ s obtained of said component device coordinated in the temperature-dependent deformation characterizing curve $h = f_{(T)}$ to said thermal deformation $h_{1th}$ of the device component at the point in time $t_1$.

A brake drum can be used as the device component.

A reaching of the response pressure $p_0$ can be employed as the starting point in time $t_0$ of the brake actuation.

At a predetermined later point in time $t_2 \ldots t_n$ after the point in time $t_1$, the following four steps can be repeated at least once. A brake pressure p and a value h, can be measured characterizing an existing deformation, at a predetermined point in time $t_2 \ldots t_n$ after initiation of a brake actuation. The component hel of the value h representing the elastic deformation of the device component can be approximated based on to the relationship $$h_{el} = \frac{1}{E_0} \cdot C \cdot (p - p_0)$$

with $p_0$ being a response pressure of the brake device, and approximating the component $h_{th}$, representing the thermal deformation, by employing the relationship $$h_{th} = h - h_{el} - h_0.$$

An approximated temperature T can be obtained of said component device coordinated in the temperature-dependent deformation characterizing curve $h = f_{(T)}$ of the device component to said thermal deformation $h_{th}$ of the device component at the point in time $t_2 \ldots t_n$.

The elasticity module $E_{1w1} \ldots E_{nw1}$, coordinated to the respective approximated temperature $T_1 \ldots T_n$ can be determined in each respective point in time $t_1 \ldots t_n$ based on the data of the temperature-dependent characterizing curve of the elasticity module $E = f_{(T)}$ of the material forming the device component.

The following steps above recited can be repeated with this elasticity module $E_{1w1} \ldots E_{nw1}$ as initial elasticity module in a repetition loop. An initial elasticity module $E_0$ can be determined which is coordinated to the initial temperature $T_0$ from said temperature dependent characterizing curve of the elasticity module $E = f_{(T)}$. A value $h_1$ can be measured at a point in time $t_1$. The component $h_{1el}$ of the value $h_1$, representing the elastic deformation of the device component, can be approximated based on to the relationship $$h_{1el} = \frac{1}{E_0} \cdot C \cdot (p_1 - p_0).$$

The component $h_{1th}$, representing the thermal deformation can be approximated by employing the relationship $$h_{1th} = h_1 - h_{1el} - h_0.$$

An approximated average temperature $T_1$ can be obtained of said component device coordinated in the temperature-dependent deformation characterizing curve $h = f_{(T)}$ to said thermal deformation $h_{1th}$ of the device component at the point in time $t_1$.

The following method steps can be repeated m-times at respective points in time $t_1 \ldots t_n$ employing in each case the elasticity module $E_{1w} \ldots E_{nw}$ as determined by the preceding repetition loop as initial elasticity module. The elasticity module $E_{1w1} \ldots E_{nw1}$ is determined which is coordinated to the respective approximated temperature $T_1 \ldots T_n$ based on the data of the temperature-dependent characterizing curve of the elasticity module $E = f_{(T)}$ of the material forming the device component.

The following steps above recited are advantageously repeated with this elasticity module $E_{1w1} \ldots E_{nw1}$ as initial elasticity module in a repetition loop. An initial elasticity module $E_0$, coordinated to the initial temperature $T_0$, is determined from a temperature-dependent characterizing curve of an elasticity module $E = f_{(T)}$. A value $h_1$ is measured at a point in time $t_1$, and is approximating the component $h_{1el}$ of the value $h_1$ representing the elastic deformation of the device component based on to the relationship $$h_{1el} = \frac{1}{E_0} \cdot C \cdot (p_1 - p_0)$$

with $p_0$ being a response pressure of the brake device. The component $h_{1th}$, representing the thermal deformation, is approximated by employing the relationship $$h_{1th} = h_1 - h_{1el} - h_0.$$

An approximated component $h_{1th}$, resulting from the thermal deformation, is obtained by employing the temperature-dependent deformation characterizing curve $h = f_{(T)}$ under approximation of the average temperature of the device component by a coordinated temperature $T_1$ at the point in time $t_1$.

A warning signal can be generated if the respective approximated temperature $T_1 \ldots T_n$ or, respectively, $T_{1wm} \ldots T_{nwm}$ reaches a predetermined limiting value.

The invention can be performed with device elements which do not have to be subjected to the temperatures prevailing in the brake device. Therefore, the invention can be performed and implemented with a particularly low number of interferences and disturbances.

The invention requires a particularly small special expenditure, if one or several of the device elements required for its performance are already present based on other reasons, such as, for example, a pressure sensor in a certain kind of electrical brake-pressure control and/or a sensor for sensing the stroke rotation angle for surveillance of the wear readjustment device, which can be employed as a deformation sensor.

If the device component, of which the average temperature is to be determined according to the invention, is selected such that the average temperature of the device component represents the thermal load of the brake device, then the invention can be further developed with simple means to a method for recognizing of a thermal overload danger of the brake device, which is also designated by the expression "fading recognition."

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The accompanying drawing, in which are shown several of the various possible embodiments of the present invention.

DESCRIPTION OF INVENTION AND PREFERRED EMBODIMENT

Figure 1:
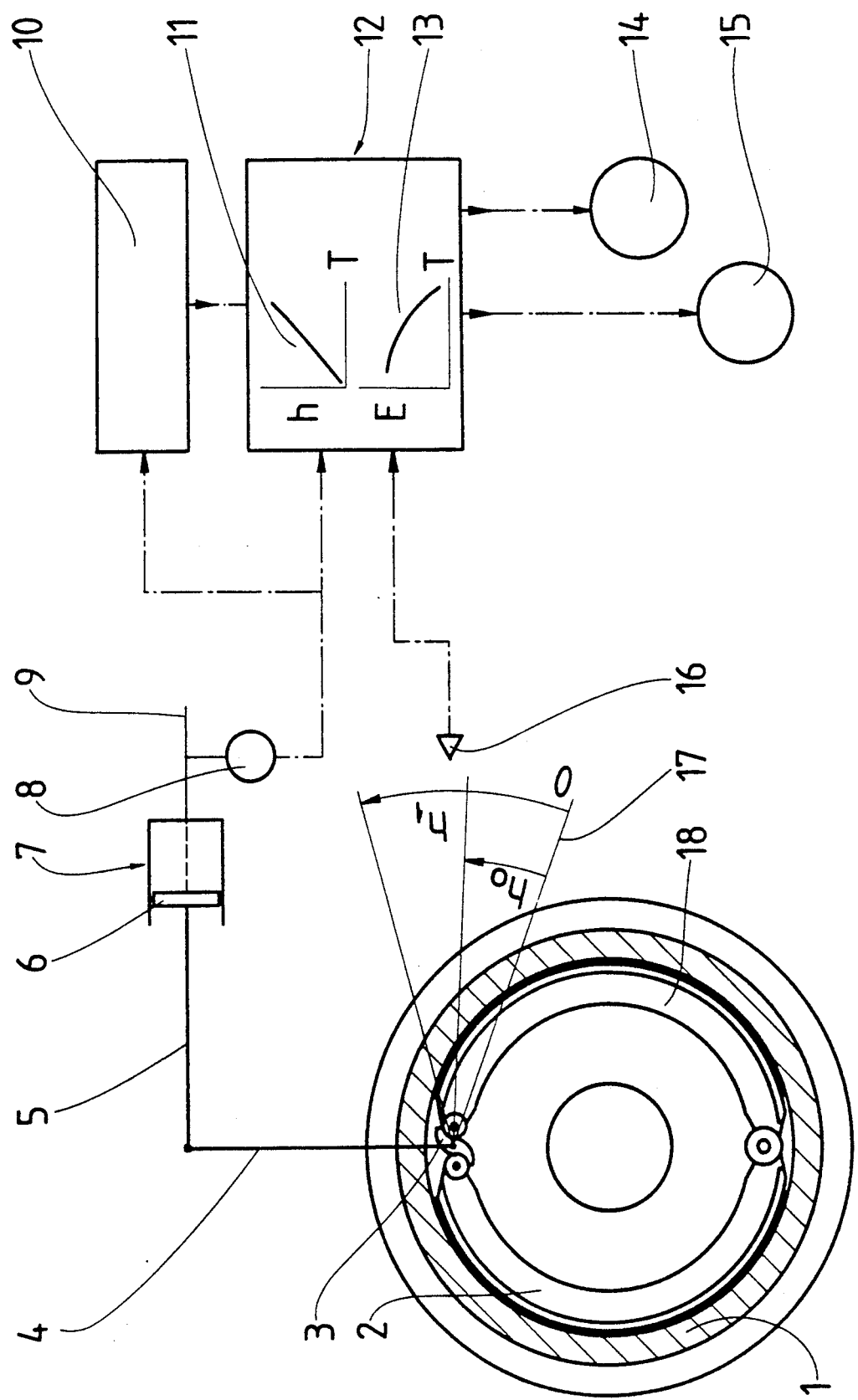
FIG. 1 illustrates a schematic diagram of the invention device for determining temperature loads on a brake device.

The brake device comprises a drum brake including a brake drum 1 and brake shoes 2, 18, as well as an actuating device, as illustrated in FIG. 1. FIG. 1 shows mechanical connection lines as full lines and electrical connection lines by dashed lines. The actuation device comprises a brake cylinder 7 with a piston member 6, which can be formed as a piston with annular seal(s) or as a membrane piston, a brake cam 3, and a transfer device 4, 5, connecting the piston member 6 to the brake cam 3. The transfer device 4, 5 is of a conventional construction and comprises a wear readjustment device, not illustrated in detail.

The brake drum 1 is that component of the brake device, where the average temperature is to be determined by the invention device.

Such a brake device is known. It appears appropriate to include within the description of the present invention newly encountered aspects of the operating behavior within the recitation of conventional aspects.

In case of an unactuated brake device, i.e. in a pressure-free state of the brake device, the diameter of the brake drum depends on the temperature of the brake drum 1 and on a mechanical base load possibly resulting from assembly and mounting. In case of a selected standard temperature, the brake drum diameter is assumed to be standard. At each other temperature, the brake drum diameter is changed relative to this standard brake drum diameter, i.e. the brake drum 1 is deformed. The temperature of the brake drum depends, in addition to the ambient temperature, also on a heating during brake actuation or upon preceding brake actuation.

If the brake device is actuated by feeding of a pressure to the brake cylinder 7 via a pressure line 9, then the brake drum 1 is mechanically loaded after overcoming of a response resistance by the press-on force of the brake shoes 2, 18 and becomes correspondingly elastically deformed. Simultaneously, the brake drum 1 is heated by the effected brake function, converting rotary energy of the wheel into thermal energy, and thus additional thermal deformation occurs. The diameter of the brake drum changes and/or enlarges accordingly.

The deformation of the brake drum 1 in the form of the change of its diameter entails a change of the travel of components of the actuation device participating in the brake actuation. These strokes can therefore be evaluated as image values of a characteristic deformation of the device component, represented by brake drum 1 in case of an effective wear readjustment device. The rotation angle of the brake cam 3 is employed as such an image value in the following.

The piston member 6 and the transfer device 4, 5, as well as the brake cam 3 and the brake shoes 2, 18, are subjected to the force of a reset means, not illustrated, in a reset setting during the unactuated state of the brake device. An arbitrary beam 17 through the rotation axis of the brake cam 3 is to define the coordinated angular rotation angle zero (0) of the brake cam 3. In this state, the brake shoes 2, 18 exhibit a release gap versus the brake drum 1.

Since in the present case, the wear readjustment device balances an increase of the release gap based on the wear of the brake lining, this readjustment depends, apart from the base position setting, which occurs in a standard case at the standard temperature, only on the temperature-dependent deformation of the brake drum 1.

Upon actuation of the brake device, the release gap is initially overcome against the initial response resistance, which includes among other things the force of the reset means, by rotation of the brake cam 3 around an initial rotation angle $h_0$ and thereby the brake shoes 2, 18 are resting directly at the brake drum 1. The initial rotation angle $h_0$ corresponds and images thus the release gap present and thereby the temperature-dependent initial base deformation and thus again the initial temperature $T_0$ of the brake drum 1. The pressure coordinated to the initial rotation angle $h_0$ is defined the response pressure $p_0$.

During the following rise of the pressure in the brake cylinder 7 to the value $p_1$, desired by the driver as a brake pressure, the brake drum 1 experiences the already recited, simultaneous elastic and additional thermal deformation with a corresponding change of its diameter.

If the brake drum 1 reaches a continuous temperature value or, respectively, at an arbitrarily selected point in time $t_1$ after the start of the brake actuation, this deformation of the brake drum 1 has resulted in an enlargement of the rotation angle of the brake cam 3 to a rotation angle $h_1$. The difference of the rotation angles $h_1-h_0$ thus represents the deformation of the brake drum under the effect of the brake pressure $p_1$. The deformation present at the continuous temperature value of the brake drum 1 or, respectively, at the point in time $t_1$, can consequently be represented by the equation $$h_1 = h_0 + h_{1el} + h_{1th} \qquad (I)$$

with $h_{1el}$ as the elastic part, and $h_{1th}$ as the thermal part of the rotation angle.

The elastic part $h_{1el}$ and the brake pressure $p_1$ are depending on each other according to Hook's Law. With respect to the special relationships present in the present brake device, this can be described in an equation of the following structure $$h_{1el} = \frac{1}{E_1} \cdot C \cdot (p_1 - p_0) \qquad (II)$$

wherein $E_1$ represents the elasticity module of the material of the brake drum 1, and C is a coefficient, which takes into consideration the effective area of the piston member 6, the force transfer relationships between the piston member 6 and the brake shoes 2, 18, the expanded cross-section of the brake drum 1 based on its press-on force, and a recalculation factor for the expansion of the brake drum in a rotation angle of the brake cam 3.

Since the recited elasticity module depends on temperature, the elasticity module has been employed with the value $E_1$ coordinated to the continuous temperature value or, respectively, to the temperature given at the point in time $t_1$ of the brake drum 1.

The schematically represented apparatus 8, 10, 12, 16 in FIG. 1 for performing of a method for the approximate determination of the average temperature of the brake drum 1 comprises a deformation sensor 16, a pressure sensor 8, a time member 10, and an evaluation electronics 12, into which the time member 10 can be integrated.

The deformation sensor 16 captures the rotation angle h of the brake cam 3 and transforms this rotation angle h into an electric deformation signal.

The pressure sensor 8 captures the pressure in the brake cylinder 7 and transforms this pressure into an electrical pressure signal.

A temperature-dependent characterizing curve of the rotation angle h, designated in the following as deformation characterizing curve 11 $h = f_{(T)}$, during pressure-free brake device, is stored in the evaluation electronics 12. "Pressure-free" means in the context of this application primarily that this characterizing curve is determined with the brake drum 1 incorporated for operational functioning, i.e. the brake drum 1 is subjected to a mechanical base load possibly resulting from assembly and mounting. If this base load is negligible in individual cases, then the deformation characterizing curve 11 can be determined also with a loose brake drum 1.

A temperature-dependent characterizing curve 13 of the elasticity module $E = f_{(T)}$ of the material of the brake drum 1 is also stored in the evaluation electronics 12.

The time member 10 is formed such that it furnishes a first measurement signal at the beginning of a brake actuation, i.e. at the point in time $t_0$, and thereafter a second measurement signal at a second predetermined point in time $t_1$.

The start and the end of the brake actuation can be signalled to the time member 10 in any suitable fashion, possibly by a signal generator at a brake-value generator actuated by the driver. In the following, the time member 10 evaluates the passage of the pressure in the brake cylinder 7 through the value of the response pressure $p_0$ as a start and as an end of the brake actuation. For this purpose, the time member 10 is connected to the output of the pressure sensor 8.

The evaluation electronics 12 is connected on the input side to the outputs of the deformation sensor 16, of the pressure sensor 8, and of the time member 10.

The evaluation electronics 12 is formed such that, upon receipt of the first measurement signal, the following steps are performed:

capturing of the initial rotation angle $h_0$, representing and imaging the initial deformation of the brake drum 1, in the shape of the corresponding deformation signal, determination of the initial temperature $T_0$, coordinated to the initial rotation angle $h_0$ of the brake drum 1, from the deformation characterizing curve 11, determination of the coordinated initial elasticity module $E_0$ of the material of the brake drum 1 from the characterizing curve 13 based on the initial temperature $T_0$, storage of the initial elasticity module $E_0$.

Furthermore, the evaluation electronics 12 is structured such that, upon receipt of the second measurement signal, the following steps are performed:

The existing brake pressure $p_1$ is captured by way of a pressure signal, and the rotation angle $h_1$, imaging the existing deformation of the brake drum 1, is captured by way of the corresponding deformation signal.

The approximated elastic component part of the rotation angle $h_1$ is calculated according to the formula $$h_{1el} = \frac{1}{E_0} \cdot C \cdot (p_1 - p_0) \qquad (III)$$

The approximated thermal component part of the rotation angle $h_1$ is calculated according to the formula $$h_{1th} = h_1 - h_{1el} - h_0 \qquad (IV).$$

The corresponding temperature $T_1$ is determined from the deformation characterizing curve 11 based on the value of $h_{1th}$.

A temperature signal, imaging the temperature $T_1$, is furnished.

The formula (IV) is the same as formula (I), however reformed to state the value $h_{1th}$. Formula (III) corresponds to formula (II), employs however the initial elasticity module $E_0$ instead of the true elasticity module $E_1$.

The evaluation electronics 12 thus determines and operates under the assumption that the elasticity module between the points in time $t_0$ and $t_1$ has not changed, and assumes an approximate average temperature $T_1$ of the brake drum 1 for the point in time $t_1$. How accurate the thus obtained rough value of the true average temperature at this point in time is, depends among other factors on the slope of the temperature-dependent characterizing curve 13 of the elasticity module, on the distance of the points in time $t_0$ and $t_1$, and on the height level of the brake pressure $p_1$. This rough value will be sufficient for many application purposes.

In case of application purposes, wherein the just mentioned rough value is insufficient, the evaluation electronics 12 can be formed such that it inserts a repetition loop between the step "determining of the corresponding temperature $T_1$ based on $h_{1th}$" and the step "furnishing of a temperature signal imaging $T_1$" with the steps:

Determination of the elasticity module $E_{1w1}$ from the characterizing curve 13 coordinated to the temperature $T_1$.

Calculation of a corrected approximated elastic component part $h_{1el w1}$ of the rotation angle $h_1$ according to formula (III), however, employing the elasticity module $E_{1w1}$.

Calculation of a corrected approximated thermal component part $h_{1th w1}$ of the rotation angle $h_1$ according to formula (IV) with $h_{1el w1}$.

Determination of the corresponding temperature $T_{1w1}$ from the deformation characterizing curve 11 based on the corrected approximated thermal component part $h_{1th w1}$.

In the above context, the subscript "w" indicates the repetition and the numeral "1" behind the subscript "w" indicates that it is a first repetition.

The initially determined temperature $T_1$ is iteratively approximated by the repetition loop to the true average temperature of the brake drum 1.

An m-times performing of the repetition loop with the elasticity module $E_{1w}$. corresponding to the temperature $T_{1w}$, determined in each case at the preceding repetition loop, allows to approximate the obtained temperature $T_{1wm}$ to the true average temperature of the brake drum 1 in case of a sufficiently large setting of the value m, wherein the number following the index "w" indicates the number of repetition loops. The calculation speed of present-day electronic microchips and computers allows in this way to determine very precisely, i.e. practically still at the point in time $t_1$, the true temperature of the brake drum 1.

The apparatus 8, 10, 12, 16 can be further developed such that the average temperature of the brake drum 1 can be determined also at a predetermined further point in time $t_2$ or at several predetermined further points in time $t_2 \ldots t_n$. The time member 10 is in this case structured such that it furnishes at the point in time $t_2$ or, respectively, at the points in time $t_2 \ldots t_n$ a second or, respectively, a second to nth measurement signal. The evaluation electronics 12 performs, in this case upon receipt of each one of these measurement signals, the further above recited steps or, respectively, if necessary, repetition loops with the then captured values $p_2 \ldots p_n$, $h_2 \ldots h_n$, and the then determined or, respectively, calculated values $h_{2el} \ldots h_{nel wm}$, $h_{2th} \ldots h_{nth wm}$, $E_{2w1} \ldots E_{nwm}$,
$T_2 \ldots T_{nwm}$,
wherein the index "2" or, respectively, "n" indicates the respective point in time.

The apparatus 8, 10, 12, 16 thereby allows a surveillance of the temperature of the brake drum 1 at several points in time within a brake actuation operation. In case of a sufficiently high number n of the points in time $t_2 \ldots t_n$ and sufficiently short time intervals between the individual points in time, the surveillance can be expanded to a surveillance without gaps for all practical purposes.

The evaluation electronics 12 can further be developed such that the in each case a determined approximated average temperature $T_1$, $T_{1w1} \ldots T_{1wm}$, $T_2 \ldots T_n$, $T_{2w1} \ldots T_{2wm}$, $T_{nw1} \ldots T_{nwm}$ is compared with a predetermined limiting value and a warning signal is furnished in addition to the temperature signal or instead of the temperature signal, in cases where the determined approximated average temperature equals or exceeds the limiting value as determined by the evaluation electronics 12. Because the average brake temperature of the brake drum 1 represents the thermal load state of the brake device, this further development of the apparatus 8, 10, 12, 16 furnishes the possibility to recognize a thermal overload danger of the brake device and the therewith associated fading danger.

A device, indicated by reference numeral 14, transforms the temperature signal and/or the warning signal into a signal shape which can be identified and accepted by the driver.

The arrangement 8, 10, 12, 16 allows also a control of the wear readjustment device. If the wear readjustment device does not readjust, then the deformation sensor 16 captures during brake actuations unusually large initial rotation angles $h_0$, which can be transformed, by way of a suitable device or by a corresponding formation of the evaluation electronics 12 into an indication or signal for the driver with respect to a functional interference of the wear readjustment device. In this context, the evaluation electronics 12 could be formed, for example, such that it performs a reasonability test of the deformation signal at the response pressure $p_0$ or at the point in time $t_0$, for example a comparison with a stored limiting value, and that the evaluation electronics 12 furnishes a warning signal upon determination of a unreasonableness of the observed values. A device 15, which transforms this warning signal into a signal shape which can be identified and accepted by the driver, indicates a further development of the apparatus 8, 10, 12, 16 also in the direction of a surveillance and control of the wear readjustment device.

As a travel, imaging the deformation of the brake drum 1, the stroke of the piston member 6 can for example also be employed. However, the primarily elastic deformation of the transfer device 4, 5 would be imaged into this stroke. In this case, a resulting elasticity module of the structural materials of the brake drum 1 and of the transfer device 4, 5 would have to be employed as elasticity module. It is apparent that the capturing of the deformation by way of the rotation angle h of the brake cam 3 according to the described embodiment invention furnishes substantial advantages as compared to the use of the stroke after piston member 6.

The brake drum 1 was selected in the embodiment because of the relatively simple capturing of its deformation a device component of the brake device to be surveyed with respect to its average temperature. The disclosures realized in the exemplified embodiment can however be correspondingly applied to other device components of a brake drum or to completely different constructions of a brake device. In particular, a disk brake can be put under surveillance in this context in a similar way. In case of a partial disk brake, for example, the brake caliper can be used as the device component to be surveyed with respect to its average temperature. In case of a full disk brake, such device component could be, for example, the brake housing which assumes the function of the brake disk. In such a case, the stroke of a piston member could become more important as the value imaging the characteristic deformation.

It will be understood that each of the elements described above, or two or more together, may also find a useful application in other types of brake systems differing from the types described above.

While the invention has been illustrated and described as embodied in the context of a method for approximate indication of mean temperature of a component of a brake device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for an approximate determination of an average temperature of a device component of a brake device including a wear readjustment device and actuatable by pressure comprising the steps
    establishing a temperature-dependent characterizing curve of a deformation value h for the device component defining a characteristic deformation of the device component relative to temperature and hereinafter referred to as deformation characterizing curve $h = f_{(T)}$ for a pressure-free brake device;
    determining a temperature-dependent characterizing curve of the elasticity module $E = f_{(T)}$ of the material forming the device component;
    measuring an initial value $h_0$ characterizing an existing initial deformation of the device component at the start of a brake actuation at a point in time $t_0$;
    obtaining an initial temperature $T_0$ of the device component relative to the value $h_0$ characterizing the initial deformation from the temperature-dependent deformation characterizing curve $h = f_{(T)}$,
    determining an initial elasticity module $E_0$, coordinated to the initial temperature $T_0$ from said temperature-dependent characterizing curve of the elasticity module $E = f_{(T)}$; at a predetermined point in time $t_1$ after initiation of a brake actuation measuring a brake pressure $p_1$ and a value $h_1$, characterizing an existing deformation;
    approximating the component $h_{1el}$ of the value $h_1$ representing the elastic deformation of the device component based on the relationship $$h_{lel} = \frac{1}{E_0} \cdot C \cdot (p_1 - p_0)$$

with $p_0$ being a response pressure of the brake device; approximating the component $h_{1th}$, representing the thermal deformation, by employing the relationship $$h_{1th} = h_1 - h_{1el} - h_0;$$

obtaining an approximated average temperature $T_1$ of said component device coordinated in the temperature-dependent deformation characterizing curve $h = f_{(T)}$ to said thermal deformation $h_{1th}$ of the device component at the point in time $t_1$.

2. The method according to claim 1, further comprising using a brake drum as the device component.

3. The method according to claim 1, further comprising employing a reaching of the response pressure $p_0$ as the starting point in time $t_0$ of the brake actuation.

4. The method according to claim 1, further comprising repeating at least once at a predetermined later point in time $t_2 \ldots t_n$ after the point in time $t_1$ the following four steps of measuring a brake pressure p and a value h, characterizing an existing deformation, at a predetermined point in time $t_2 \ldots t_n$ after initiation of a brake actuation;

approximating the component $h_{el}$ of the value h representing the elastic deformation of the device component based on to the relationship $$h_{el} = \frac{1}{E_0} \cdot C \cdot (p - p_0)$$

with $p_0$ being a response pressure of the brake device; approximating the component $h_{th}$, representing the thermal deformation, by employing the relationship $$h_{th} = h - h_{el} - h_0;$$

obtaining an approximated temperature T of said component device coordinated in the temperature-dependent deformation characterizing curve $h = f_{(T)}$ of the device component to said thermal deformation $h_{th}$ of the device component at the point in time $t_2 \ldots t_n$.

5. The method according to claim 1, further comprising in each respective point in time $t_1 \ldots t_n$ determining the elasticity module $E_{1w1} \ldots E_{nw1}$, coordinated to the respective approximated temperature $T_1 \ldots T_n$ based on the data of the temperature-dependent characterizing curve of the elasticity module $E = f_{(T)}$ of the material forming the device component.

6. The method according to claim 5, further comprising repeating with this elasticity module $E_{1w1} \ldots E_{nw1}$ as initial elasticity module in a repetition loop the following steps above recited:

determining an initial elasticity module $E_0$, coordinated to the initial temperature $T_0$ from said temperature-dependent characterizing curve of the elasticity module $E = f_{(T)}$; approximating the component $h_{1el}$ of the value $h_1$ representing the elastic deformation of the device component based on to the relationship $$h_{lel} = \frac{1}{E_0} \cdot C \cdot (p_1 - p_0)$$

with $p_0$ being a response pressure of the brake device; approximating the component $h_{1th}$, representing the thermal deformation, by employing the relationship $$h_{1th} = h_1 - h_{1el} - h_0;$$

obtaining an approximated average temperature $T_1$ of said component device coordinated in the temperature-dependent deformation characterizing curve $h = f_{(T)}$ to said thermal deformation $h_{1th}$ of the device component at the point in time $t_1$.

7. The method according to claim 6, further comprising m-times repeating the following method steps at respective points in time $t_1 \ldots t_n$ employing in each case the elasticity module $E_{1w} \ldots E_{nw}$ as determined by the preceding repetition loop as initial elasticity module; determining the elasticity module $E_{1w1} \ldots E_{nw1}$, coordinated to the respective approximated temperature $T_1 \ldots T_n$ based on the data of the temperature-dependent characterizing curve of the elasticity module $E = f_{(T)}$ of the material forming the device component;

repeating with this elasticity module $E_{1w1} \ldots E_{nw1}$ as initial elasticity module in a repetition loop the following steps above recited:

determining an initial elasticity module $E_0$, coordinated to the initial temperature $T_0$ from said temperature-dependent characterizing curve of the elasticity module $E = f_{(T)}$; approximating the component $h_{1el}$ of the value $h_1$ representing the elastic deformation of the device component based on to the relationship $$h_{lel} = \frac{1}{E_0} \cdot C \cdot (p_1 - p_0)$$

with $p_0$ being a response pressure of the brake device; approximating the component $h_{1th}$, representing the thermal deformation by employing the relationship $$h_{1th} = h_1 - h_{1el} - h_0;$$

obtaining an approximated average temperature $T_1$ of said component device coordinated in the temperature-dependent deformation characterizing curve $h = f_{(T)}$ to said thermal deformation $h_{1th}$ of the device component at the point in time $t_1$.

8. The method according to claim 1, further comprising generating a warning signal if the respective approximated temperature $T_1 \ldots T_n$ or, respectively, $T_{1wm} \ldots T_{nwm}$ reaches a predetermined limiting value.

9. A method for the approximate determination of an average temperature of a device component of a brake device, actuatable by pressure and comprising a wear readjustment device, wherein a) a temperature-dependent characterizing curve of a value h, imaging a characteristic deformation of the device component, represented by the brake drum (1), hereinafter referred to as deformation characterizing curve $h = f_{(T)}$, is determined for a pressure-free status of said brake device, b) a temperature-dependent characterizing curve of the elasticity module $E = f_{(T)}$ of the material forming the device component is determined, a value $h_0$ characterizing an existing initial deformation of the device component is measured at the start of a brake actuation (point in time $t_0$), d) the initial temperature $T_0$ of the device component coordinated to the value $h_0$, characterizing the initial deformation, is obtained from the temperature-dependent deformation characterizing curve $h = f_{(T)}$, e) an initial elasticity module $E_0$, coordinated to the initial temperature $T_0$, is determined from said temperature-dependent characterizing curve of the elasticity module $E = f_{(T)}$, f) a brake pressure $p_1$ and a value $h_1$, characterizing an existing deformation, are measured at a predetermined point in time $t_1$ after initiation of a brake actuation, g) from the value $h_1$, measured at the point in time $t_1$, is approximated
ga) according to the relationship $$h_{lel} = \frac{1}{E_0} \cdot C \cdot (p_1 - p_0)$$

its component $h_{1el}$ representing its elastic deformation, and
gb) is approximated according to the relationship $$h_{1th} = h_1 - h_{1el} - h_0$$

its component $h_{1th}$, representing the thermal deformation, with $p_0$ as a response pressure of the brake device, h) the coordinated temperature $T_1$ as approximated average temperature of the device component at the point in time $t_1$, is taken, based on the approximated component $h_{1th}$, representing the thermal deformation, from the temperature-dependent deformation characterizing curve $h = f_{(T)}$.

10. The method according to claim 9, wherein The method according to claim 9, wherein a reaching of the response pressure $p_0$ is evaluated as a start of the brake actuation at the point in time $t_0$.

11. The method according to claim 9, wherein the method steps f), f), and h) of claim 9 are repeated at a predetermined point in time $t_2$ or are repeated at several predetermined points in time $t_2 \ldots t_n$ after the point in time $t_1$.

12. The method according to claim 9, wherein, in each respective point in time $t_1 \ldots t_n$
a) an elasticity module $E_{1w1} \ldots E_{nw1}$, coordinated to the respective approximated temperature $T_1 \ldots T_n$, is received from the temperature-dependent characterizing curve of the elasticity module $E = f_{(T)}$ of the material forming the device component, and
b) the method steps e), g), and h) of claim 9 are repeated with this elasticity module $E_{1w1} \ldots E_{nw1}$ as initial elasticity module in a repetition loop.

13. The method according to claim 12, wherein the method steps a) and b) of claim 12 are, in the respective point in time $t_1 \ldots t_n$, m-times repeated with the elasticity module $E_{1w} \ldots E_{nw}$, determined by the in each case preceding repetition loop, as initial elasticity module.

14. The method according to claim 9, wherein a warning signal is furnished if the respective approximated temperature $T_1 \ldots T_n$ or, respectively, $T_{1wm} \ldots T_{nwm}$ reaches a predetermined limiting value.

15. The apparatus according to claim 9, wherein the evaluation electronics (12) is formed such tat
a) it receives at the point in time $t_1$ or, respectively, at the points in time $t_2 \ldots t_n$ from the temperature-dependent characterizing line (13) of the elasticity module $E = f_{(T)}$ the elasticity module $E_{1w1} \ldots E_{ne1}$, coordinated to the respective temperature $T_1 \ldots T_n$,
b) the method steps g) and h) of claim 1 are repeated with this elasticity module $E_{1w1} \ldots E_{nw1}$ as initial elasticity module, and
c) the temperature signal or, respectively, the warning signal are formed corresponding to approximated average temperature $T_{1w1} \ldots T_{nw1}$, determined during the repetition.

16. The apparatus according to claim 15, wherein the evaluation electronics (12) is formed such that is repeats m-times the performance of the method features a) and b) of claim 19 with the value of the elasticity module $E_{1w} \ldots E_{nw}$, determined during the in each case preceding performance, and wherein the temperature signal or, respectively, the warning signal is formed correspondingly at the approximated temperature $T_{1wm} \ldots T_{nwm}$, determined at the $m^{th}$ repetition.

17. An apparatus for performing a method for the approximate determination of an average temperature of a device component of a brake device, actuable by pressure and comprising a wear readjustment device and further comprising, a) a deformation sensor (16) for capturing values $h_1 \ldots h_n$, imaging the characterizing deformation of the device component and for transforming said characterizing deformation into an electrical deformation signal, b) a pressure sensor (8) capturing pressure $p_0 \ldots p_n$ and transforming this pressure into an electrical pressure signal, c) an evaluation electronics (12) receiving the deformation signal and the pressure signal, d) the temperature-dependent deformation characterizing curve (11) $h = f_{(T)}$ of the device component as well as the temperature-dependent characterizing curve (13) of the elasticity module $E = f_{(T)}$ of the material of the device component stored in the evaluation electronics (12), e) a time member (10) furnishing at the start of the brake actuation at said point in time $t_0$ and at th point in time $t_1$ or, respectively, in the thereupon following points in time $t_2 \ldots t_n$, a first or, respectively, second to $n^{th}$ measurement signal to the evaluation electronics (12), f) wherein the evaluation electronics (12) is formed such that, upon receipt of the first measurement signal, the following steps are performed and the initial elasticity module $E_0$ is stored,
fa) a value $h_0$ characterizing an existing initial deformation of the device component is measured at the start of a brake actuation (point in time $t_0$),
fb) the initial temperature $T_0$ of the device component coordinated to the value $h_0$, characterizing the initial deformation, is obtained from the temperature-dependent deformation characterizing curve $h = f_{(T)}$, fc) an initial elasticity module $E_0$, coordinated to the initial temperature $T_0$, is determined from said temperature-dependent characterizing curve of the elasticity module $E = f_{(T)}$, g) the evaluation electronics (12) is furthermore formed such that, upon receipt of the second measurement signal and possibly the further measurement signals, in each case the following steps are performed ga) a brake pressure $p_1$ and a value $h_1$, characterizing an existing deformation, are measured at a predetermined point in time $t_1$ after initiation of a brake actuation, gb) from the value $h_1$, measured at the point in time $t_1$, is approximated
i) according to the relationship $$h_{1el} = \frac{1}{E_0} \cdot C \cdot (p_1 - p_0)$$

its component $h_{1el}$ representing its elastic deformation, and ii) is approximated according to the relationship $$h_{1th} = h_1 - h_{1el} - h_0$$

its component $h_{1th}$, representing the thermal deformation, with $p_0$ as a response pressure of the brake device, c) the coordinated temperature $T_1$ as approximated average temperature of the device component at the point in time $t_1$, is taken, based on the approximated component $h_{1th}$, representing the thermal deformation, from the temperature-dependent deformation characterizing curve $h = f_{(T)}$, and a temperature signal is furnished, imaging the in each case approximated average temperature $T_1$ . . . $T_n$ of the device component.

18. The apparatus according to claim 17, wherein the time member (10) receives the pressure signal and furnishes the first measurement signal upon application of a pressure $p_0$.

19. The apparatus according to claim 17, wherein the evaluation electronics (12) is formed such that it compares the in each case approximated average temperature $T_1$ . . . $T_n$ or, respectively, $T_{1wm}$ . . . $T_{nwm}$ with a stored limiting value and furnishes a warning signal, if the in each case approximated average temperature $T_1$ . . . $T_n$ or, respectively $T_{1wm}$ . . . $T_{nwm}$ is at least equal to a preset limiting value.

20. An apparatus for performing a method for the approximate determination of an average temperature of a device component of a brake device, actuatable by pressure and comprising a wear readjustment device, and further comprising a) a deformation sensor (16) capturing the value $h_1$ . . . $h_n$, imaging the characteristic deformation of the device component and transforming the value $h_1$ . . . $h_n$ into an electrical deformation signal, b) a pressure sensor (8) capturing the pressure $p_0$ . . . $p_n$ and transforming the pressure $p_0$ . . . $p_n$ into a corresponding electrical pressure signal, c) an evaluation electronics (12) receiving the deformation signal and the pressure signal, d) a temperature-dependent deformation characterizing curve (11) $h = f_{(T)}$ of the device component as well as the temperature-dependent characterizing curve (13) of the elasticity module $E = f_{(T)}$ of the material of the characterizing component, brake drum (1), stored in the evaluation electronics (12), e) a time member (10) delivering at the start of the brake actuation (point in time $t_0$) and at the point in time $t_1$ or, respectively, in the thereupon following points in time $t_2$ . . . $t_n$ a first or, respectively, a second through $n^{th}$ measurement signal to the evaluation electronics (12), f) wherein the evaluation electronics (12) is formed such that, upon receipt of the first measurement signal, the following steps are performed and the elasticity module $E_0$ is stored in memory, fa) a value $h_0$ characterizing an existing initial deformation of the device component is measured at the start of a brake actuation (point in time $t_0$), fb) the initial temperature $T_0$ of the device component coordinated to the value $h_0$, characterizing the initial deformation, is obtained from the temperature-dependent deformation characterizing curve $h = f_{(T)}$, fc) an initial elasticity module $E_0$, coordinated to the initial temperature $T_0$, is determined from said temperature-dependent characterizing curve of the elasticity module $E = f_{(T)}$, g) the evaluation electronics (12) is further formed such that, upon receipt of the second measurement signal and, possibly, of the further measurement signals, in each case the following steps are performed, ga) a brake pressure $p_1$ and a value $h_1$, characterizing an existing deformation or a brake pressure $p_2$ . . . $p_n$ and a value $h_2$ . . . $h_n$, respectively, are measured, gb) from the value $h_1$ or $h_2$ . . . $h_n$, respectively, is approximated
i) according to the relationship $$h_{1el} = \frac{1}{E_0} \cdot C \cdot (p_1 - p_0)$$

or $$h_{2el...nel} = \frac{1}{E_{1...n}} \cdot C \cdot (p_{2...n} - p_0),$$

respectively, its component $h_{1el}$ or $h_{2el}$ . . . $h_{nel}$, respectively, representing its elastic deformation, and ii) is approximated according to the relationship $$h_{2th...nth} = h_2 ... n - h_{2el} ... nel - h_0,$$

respectively, its component $h_{1th}$ or $h_{2th}$ . . . $h_{nth}$, respectively, representing the thermal deformation, with $p_0$ as a response pressure of the brake device, gc) the coordinated temperature $T_1$ or $T_2$ . . . $T_n$, respectively, as approximated average temperature of the device component at the point in time $t_1$ or at several predetermined points in time $t_2$ . . . $t_n$ after the point in time $t_1$, is taken, based on the approximated component $h_{1th}$ or $h_{2th}$ . . . $h_{nth}$, respectively, representing the thermal deformation, from the temperature-dependent deformation characterizing curve $h = f_{(T)}$, and the respective, approximated average temperature $T_1$ . . . $T_n$ of the device component is compared with a stored limiting value and a warning signal is furnished upon determination that the temperature $T_1 \ldots T_n$ of the device component is at least equal to the stored limiting value.

21. The apparatus according to claim 20, wherein the time member (10) receives the pressure signal and furnishes the first measurement signal upon application of a pressure $p_0$.

22. An apparatus for determining temperatures based on deformation comprising
a device component of a device actuable by pressure;
a deformation sensor monitoring the device component and furnished for capturing values $h_1 \ldots h_n$ for imaging the characterizing deformation of the device component, and for transforming said characterizing deformation into an electrical deformation signal;
an evaluation electronics having a first input connected to the deformation sensor and which evaluation electronics receives the deformation signal;
a pressure sensor connected to the evaluation electronics for capturing the pressure $p_0 \ldots p_n$ and for transforming this pressure into an electrical pressure signal to be delivered to the evaluation electronics;
a memory storage contained in the evaluation electronics for storing the temperature-dependent deformation characterizing curve $h = f_{(T)}$ of the device component, and the temperature-dependent characterizing curve of the elasticity module $E = f_{(T)}$ of the material of the device component;
a time member connected to the evaluation electronics and connected to the pressure sensor, which time member furnishes at the start of the device component actuation at a point in time $t_0$ and at a point in time $t_1$ or, respectively, in thereupon following points in time $t_2 \ldots t_n$, a first or, respectively, second to $n^{th}$ measurement signal to the evaluation electronics;
wherein the evaluation electronics is constructed such that upon receipt of said first measurement signal the following three steps are performed:
measuring an initial value $h_0$ characterizing an existing initial deformation of the device component at the start of the device component actuation at said point in time $t_0$;
obtaining an initial temperature $T_0$ of the device component relative to the value $h_0$ characterizing the initial deformation from the temperature-dependent deformation characterizing curve $h = f_{(T)}$;
determining an initial elasticity module $E_0$, coordinated to the initial temperature $T_0$ from the temperature-dependent characterizing curve of the elasticity module $E = f_{(T)}$; followed by storing said initial elasticity module $E_0$ in the evaluation electronics;
wherein the evaluation electronics is furthermore constructed such that, upon receipt of the second measurement signal and possibly the further measurement signals, in each case the following steps are performed:
measuring a brake pressure $p_1 \ldots p_n$ and a value $h_1 \ldots h_n$, characterizing an existing deformation, at said point in time $t_1$ and possibly the further points in time $t_2 \ldots t_n$ after initiation of a brake actuation;
approximating the component $h_{1el} \ldots h_{nel}$ of the value $h_1 \ldots h_n$ representing the elastic deformation of the device component based on to the relationship $$h_{1el} = \frac{1}{E_0} \cdot C \cdot (p_1 - p_0) \ldots h_{nel} = \frac{1}{E_0} \cdot C \cdot (p_n - p_0)$$

with $p_0$ being a response pressure of the brake device;
approximating the component $h_{1th} \ldots h_{nth}$, representing the thermal deformation, by employing the relationship $$h_{1th} = h_1 - h_{1el} - h_0 \ldots h_{1nth} = h_n - h_{nel} - h_0;$$

obtaining an approximated average temperature $T_1 \ldots T_n$ of said component device coordinated in the temperature-dependent deformation characterizing curve $h = f_{(T)}$ to said thermal deformation $h_{1th} \ldots h_{nth}$ of the device component at the point in time $t_1 \ldots t_n$;
followed by furnishing of a temperature signal, imaging of the in each case approximated average temperature $T_1 \ldots T_n$ of the device component.

23. An apparatus according to claim 22, wherein the device component is a brake drum furnished with a readjustment means for the brake settings.

24. The apparatus according to claim 22, wherein the time member receives the pressure signal and furnishes the first measurement signal upon application of a pressure $p_0$.

25. The apparatus according to claim 22, wherein the evaluation electronics (12) is formed such that it repeats at any point of time $t_1 \ldots t_n$ m-times the performance of the method features with the value of the elasticity module $E_{1w} \ldots E_{nw}$ determined during the in each case preceding performance:
approximating the component $h_{1el} \ldots h_{nelwm}$ of the value $h_1 \ldots h_{nwm}$ representing the elastic deformation of the device component based on to the relationship $$h_{1el} = \frac{1}{E_0} \cdot C \cdot (p_1 - p_0) \ldots h_{nwm} = \frac{1}{E_0} \cdot C \cdot (p_{nwm} - p_0)$$

approximating the component $h_{1th} \ldots h_{nthwm}$, representing the thermal deformation, by employing the relationship $$h_{1th} = h_1 - h_{1el} - h_0 \ldots h_{nthwm} = h_{nwm} - h_{nelwm} - h_0;$$

obtaining an approximated average temperature $T_1 \ldots T_{nwm}$ of said component device coordinated in the temperature-dependent deformation characterizing curve $h = f_{(T)}$ to said thermal deformation $h_{1th} \ldots h_{nthwm}$ of the device component at the point in time $t_1 \ldots t_n$; followed by generating a temperature signal or, respectively, a warning signal corresponding to the approximated temperature $T_{1wm} \ldots T_{nwm}$, determined at the $m^{th}$ repetition.

26. The apparatus according to claim 22, wherein the evaluation electronics is formed such that it compares the in each case approximated average temperatures $T_1 \ldots T_n$ or, respectively, $T_{1wm} \ldots T_{nwm}$ with a stored limiting value and furnishes a warning signal, if the in each case approximated average temperature $T_1 \ldots T_n$ or, respectively $T_{1wm} \ldots T_{nwm}$ is at least equal to a preset limiting value.

27. An apparatus for determining temperatures based on deformation comprising a deformation sensor capturing the elasticity value $h_1 \ldots h_n$, imaging the characterizing deformation of the device component and transforming the value $h_1 \ldots h_n$ into an electrical deformation signal;

a pressure sensor capturing the pressure $p_0 \ldots p_n$ and transforming the pressure $p_0 \ldots p_n$ into a corresponding electrical pressure signal;

an evaluation electronics connected to the deformation sensor and to the pressure sensor and receiving the deformation signal and the pressure signal;

a memory storage contained in the evaluation electronics for storing a temperature-dependent deformation characterizing curve $h = f_{(T)}$ of the device component, and the temperature-dependent characterizing curve of the elasticity module $E = f_{(T)}$ of the material of the characterizing component;

a time member connected to the evaluation electronics and connected to the pressure sensor for delivering at the start of the device component actuation at a point in time $t_0$ and at the point in time $t_1$ or, respectively, in thereupon following points in time $t_2 \ldots t_n$ a first or, respectively, a second through nth measurement signal to the evaluation electronics;

wherein the evaluation electronics is constructed such that upon receiving the first measurement signal, the following steps are performed:

measuring an initial value $h_0$ characterizing an existing initial deformation of the device component at the start of the device component actuation at said point in time $t_0$;

obtaining an initial temperature $T_0$ of the device component relative to the value $h_0$ characterizing the initial deformation from the temperature-dependent deformation characterizing curve $h = f_{(T)}$;

determining an initial elasticity module $E_0$, coordinated to the initial temperature $T_0$ from the temperature-dependent characterizing curve of the elasticity module $E = f_{(T)}$; followed by storing said initial elasticity module $E_0$ in the evaluation electronics;

followed by storing the elasticity module $E_0$ in memory; wherein the evaluation electronics is further constructed such that, upon receipt of the second measurement signal and, possibly, of the further measurement signals, in each case the following steps are performed:

measuring a brake pressure $p_1 \ldots p_n$ and a value $h_1 \ldots h_n$, characterizing an existing deformation, at said point in time $t_1$ and possibly the further points in time $t_2 \ldots t_n$ after initiation of a brake actuation;

approximating the component $h_{1el} \ldots h_{nel}$ of the value $h_1 \ldots h_n$ representing the elastic deformation of the device component based on to the relationship $$h_{1el} = \frac{1}{E_0} \cdot C \cdot (p_1 - p_0) \ldots h_{nel} = \frac{1}{E_0} \cdot C \cdot (p_n - p_0)$$

with $p_0$ being a response pressure of the brake device;

approximating the component $h_{1th} \ldots h_{nth}$, representing the thermal deformation, by employing the relationship $$h_{1th} = h_1 - h_{1el} - h_0 \ldots h_{nth} = h_n - h_{nel} - h_0;$$

obtaining an approximated average temperature $T_1 \ldots T_n$ of said component device coordinated in the temperature-dependent deformation characterizing curve $h = f_{(T)}$ to said thermal deformation $h_{1th} \ldots h_{nth}$ of the device component at the point in time $t_1 \ldots t_n$;

followed by comparing the respective, approximated average temperature $T_1 \ldots T_n$ of the device component with a stored limiting value and by furnishing a warning signal upon determination that the temperature $T_1 \ldots T_n$ of the device component is at least equal to the stored limiting value.

* * * * *